United States Patent Office 2,800,761
Patented July 30, 1957

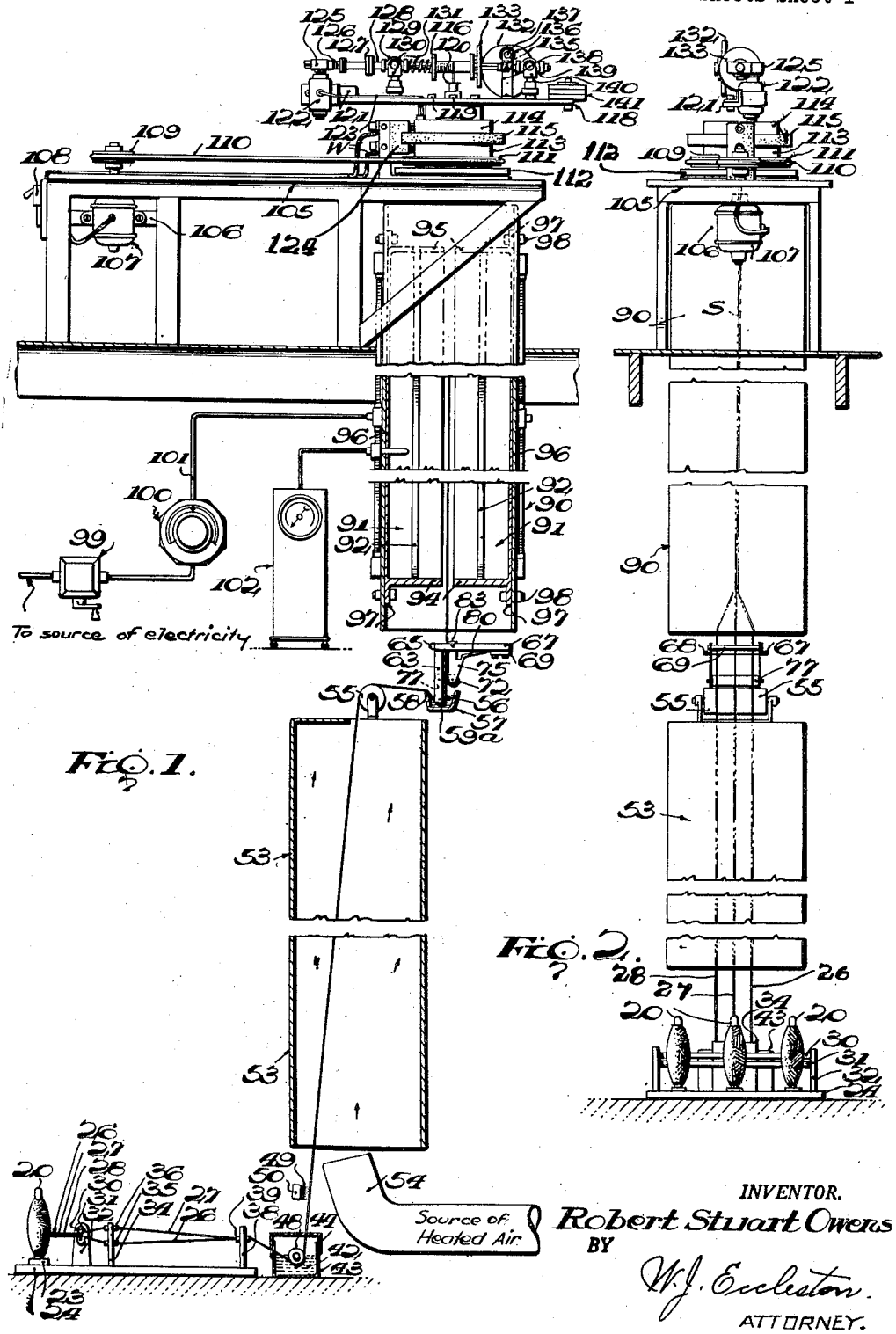

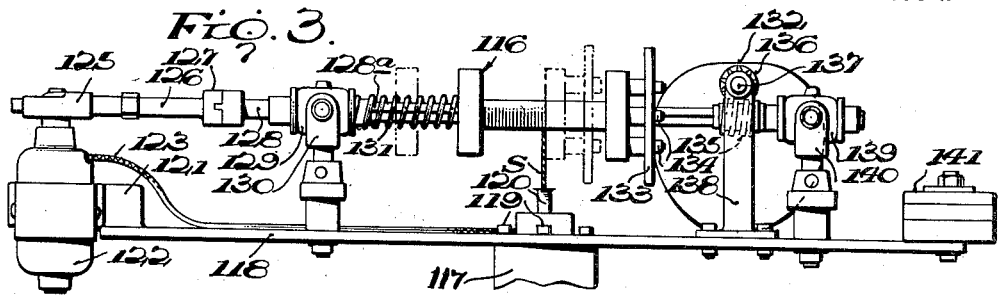
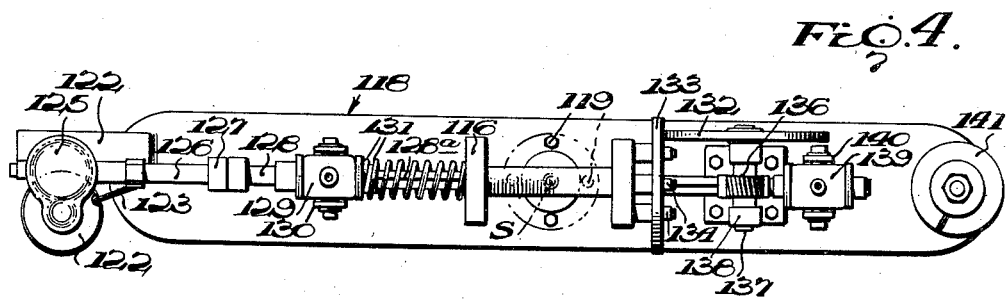
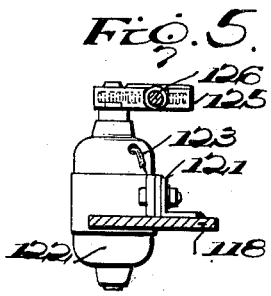
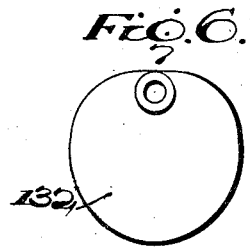
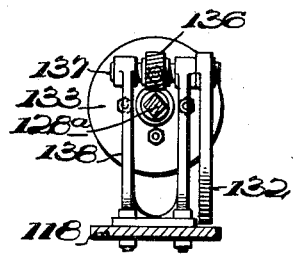
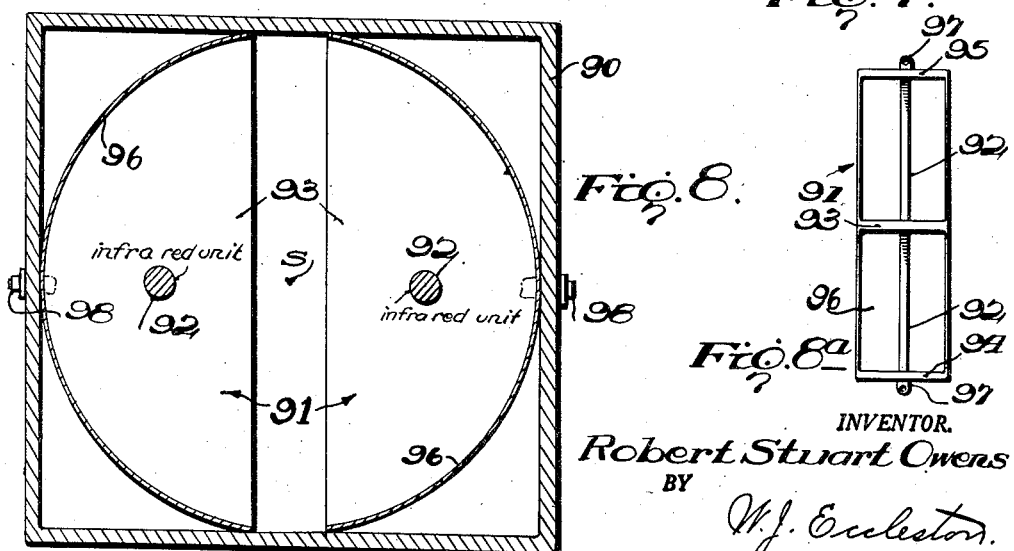

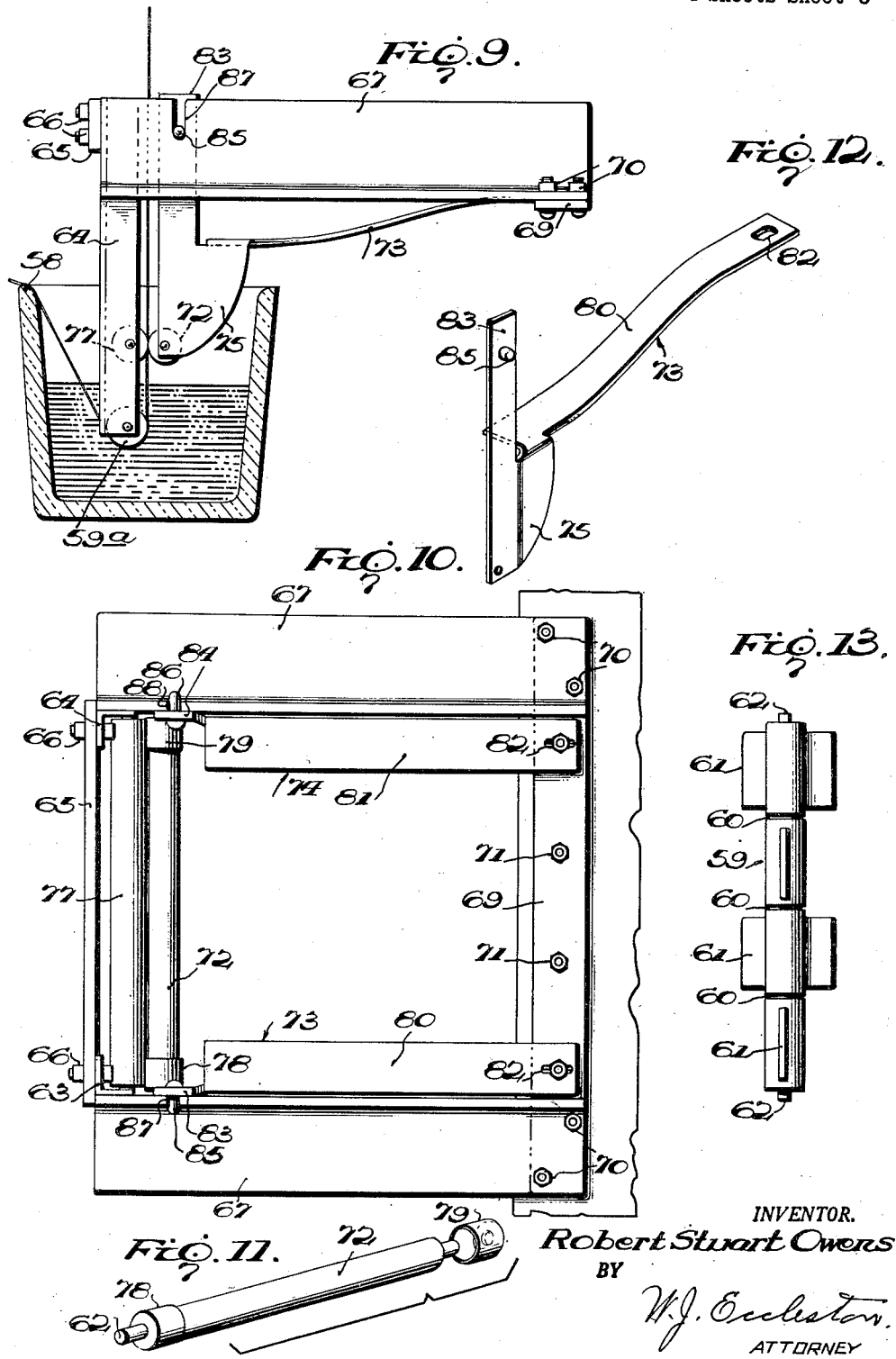

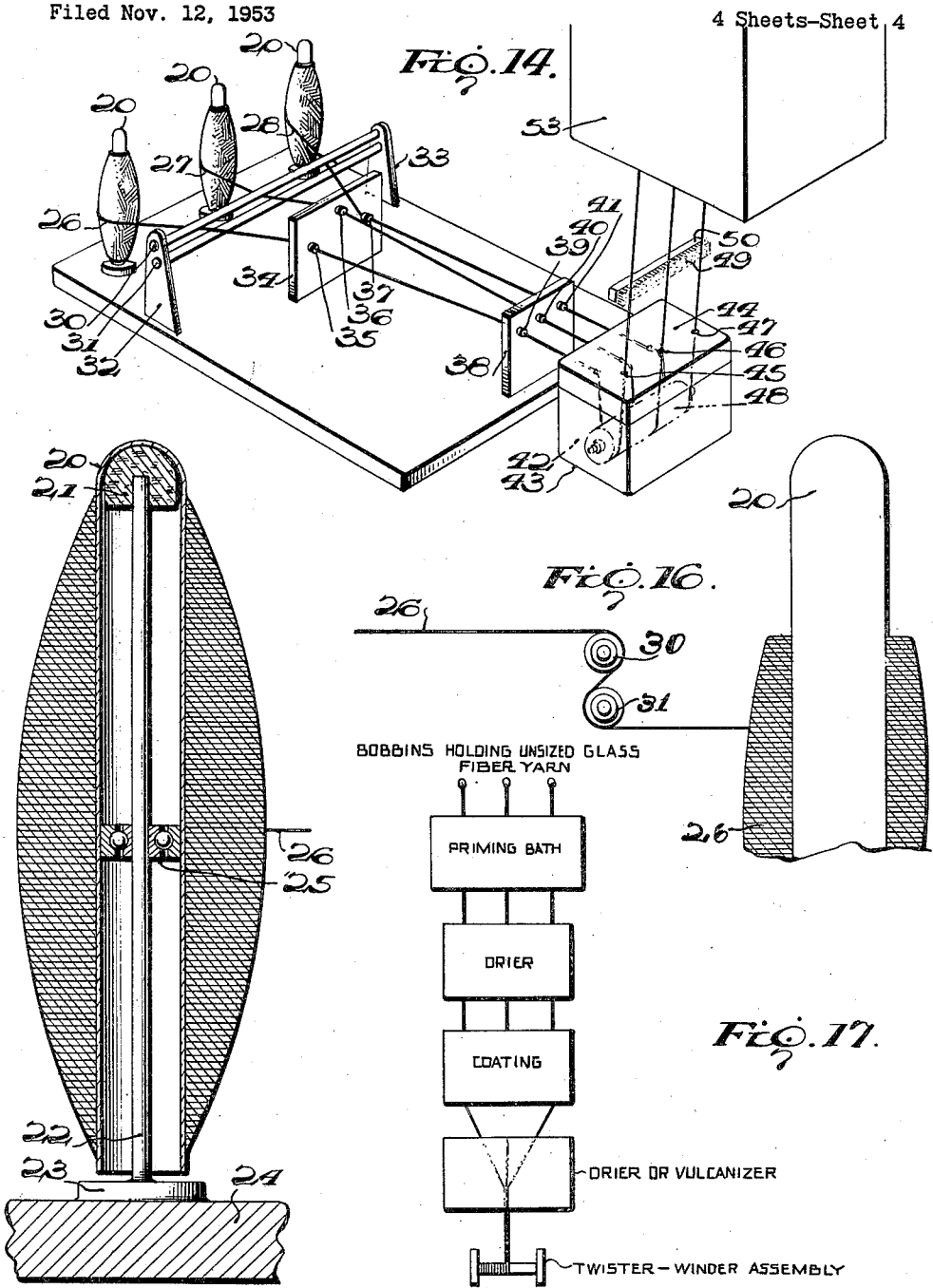

2,800,761
APPARATUS FOR MAKING COATED FIBER GLASS STRANDS

Robert Stuart Owens, Charlottesville, Va.

Application November 12, 1953, Serial No. 391,439

7 Claims. (Cl. 57—35)

This invention relates to apparatus for making coated fiber glass strands, such as may be useful for making filter cloths, woven fabrics, cords or ropes, fillers for articles of clothing, etc. In my Patent No. 2,243,917 dated June 3, 1941, I disclosed a corrosion resistant yarn consisting of a core of fine glass fibers, a binding material such as rubber cement, and an outer coating or sheathing of rubber or chlorinated rubber. The apparatus of the invention will produce similar coated yarns except that the yarns will have a twist imparted while their coatings are still cohesive and moldable.

The present invention further aims to provide relatively simple, easily constructed and readily adjustable apparatus for producing twisted coated fiber glass strands bonded together to form a unitary structure. Other objects will be understood from the following description of the preferred embodiment of the invention shown in the accompanying drawings forming a part of this specification.

In said drawings—

Fig. 1 is a somewhat diagrammatic elevational view of the apparatus;

Fig. 2 is a side elevation of the same omitting a few details;

Fig. 3 is a side elevation of the winder-twister assembly, shown on a much larger scale than in Figs. 1 and 2;

Fig. 4 is a top plan view of the winder-twister assembly;

Fig. 5 is a detail partly in vertical section showing the mounting for the winding motor;

Fig. 6 is an elevation of the cam used to move the spool which winds up the finished strand;

Fig. 7 is a vertical section showing the cam and follower;

Fig. 8 is a cross section through the drying or vulcanizing chamber showing two of the heating units;

Fig. 8a is an elevation on a small scale of one of the heating units;

Fig. 9 is a side elevation partly in section showing the strands being coated in a coating bath;

Fig. 10 is a full size top plan view of the supporting structure for the coating and wiping members of Fig. 9;

Fig. 11 is a perspective view of one of the wiping cylinders showing one of its two shims removed;

Fig. 12 is a perspective view of one of the two complementary spring members which maintain the wiping cylinders in substantial contact;

Fig. 13 is a plan view of a modified form of agitating roll;

Fig. 14 is a perspective view of the spool mount and strand-guiding members and the priming bath, together with the lower end of the drying chamber or chute through which the primed strands pass;

Fig. 15 is a substantially full size sectional elevation showing a spool and its mounting;

Fig. 16 is a fragmentary view in vertical section showing how the strands are guided off the spool when the strands are strong;

Fig. 17 is a flow sheet or diagram showing the process of making coated twisted glass fiber strands by means of the apparatus of the invention.

The glass fiber yarn to be coated by the apparatus of my invention may be of various weights and strengths. A yarn which has been successfully used was supplied by the Owens-Corning Fiberglas Corporation, single strand yarn labeled "EDC 450 1/0," i. e. 44,100 yards per pound, diameter 0.0040 in., guaranteed minimum breaking strength 1.1 pounds. This yarn and others like it come on the market wound on spools or bobbins made of paper or the like. If the strands from the glass fiber manufacturer are coated with a starch mixture and an oil, as has been customary, this sizing must be removed by running the strands through a bath or through a heating chamber to burn off the sizing, before applying the priming coat. The bath will naturally vary with the character of the sizing: to remove oil, a bath of ethyl acetate may be employed. The unsized or "desized" strands are here shown as being wound on glass tubes 20 (Figs. 14 and 15) which are like chemical laboratory test tubes turned upside down so that their closed ends are at the top. Glass tubes are used whenever the sizing-removing bath is of such a character that it might attack or soften paper bobbins. Metal tubes could also be used if the metal was such that it would not be attacked by the solvent used in the desizing bath. Glass tubes 20 are supported by contact of their upper closed ends with a cork or other frictional element or plug 21 fixed to the top of a stationary vertical rod 22 whose lower end has an enlarged foot 23 fixed upon a platform or table 24. A ball bearing 25 fixed upon vertical rod 22 about midway between its upper and lower ends, and having its outer race making frictional contact with the inner walls of the glass tube, provides a partial support for the wound strand 26 and maintains the glass tube in proper vertical and centered position. Cork disk 21 may be replaced by composition disks of various materials to give variable frictional drags. Cork is excellent because it provides the right amount of frictional resistance to turning of a glass tube as the strands are pulled during operation of the apparatus to be described. Three strands 26, 27, 28 are shown in Figs. 14 and 2, wound on three like glass tubes 20 providing bobbins.

The three strands 26, 27, 28 are led between two horizontal glass guide rods 30, 31 secured to a pair of brackets 32, 33 at their opposite ends, the brackets being fixed to platform 24. Also secured to the platform in upright position is the first vertical guide 34 which is a plate having three short horizontal tubes 35, 36, 37 fixed therein, with the middle tube 36 higher than the other two tubes 35, 37. The three strands 26, 27, 28 pass through tubes 35, 36, 37 respectively and then go through the second vertical guide 38 having its horizontal guiding tubes 39, 40, 41 all on the same level. All the guiding tubes may be short sections of glass tubing and their function is to lay the fibers and catch the fuzz. The inlet ends of all the guiding tubes 35, 36, 37, 39, 40 and 41 should be fired and flared (not shown) to prevent the raising of a nap on the strands. The platform 24, the first and second vertical guides, and all parts used in feeding the strands to the priming bath to be described should be well grounded to obviate building up static charges. This ground is not shown but is well understood and needs no illustration.

After the fuzz has been removed from the strands, they pass into a priming bath 42 contained in a receptacle 43 which may have a removable cover 44 provided with three perforations 45, 46, 47 for the strands. Dipping into the bath 42 (which may be of neoprene cement in a solvent such as toluene plus ethyl acetate) is a coating roll 48 which the strands frictionally contact and pass around so as to be completely immersed in the priming bath 42; then they pass up through perforations in the cover 44 past a fixed fabric wiper which may be a strip of velvet or other piled or plush material 49 attached to a horizontal bar 50 which is so supported that the strands must rub against fabric 49. The function of the wiper is to remove any fuzz which may remain on the strands after passing through the priming bath. The strands then enter the lower end of a drying chamber 53 which is like a vertical chute, being elongated and open at both ends. At its lower end drying chamber 53 receives a blast of heated air from a heating unit (not shown) which may be heated by electricity or steam and which blows hot air through a discharge duct or pipe 54 into and through the drying chamber. Chamber 53 may be as little as 12 ft. long but preferably is 30 ft. long or even longer, and its inside dimensions may be as little as 9 in. square or 9 in. diameter if only a few strands are being processed. The longer chamber 53 is, the faster the strands can move through it with the same rate of drying, and the greater the production of the apparatus. The strands pass through chamber 53 without contact with its walls or with each other and emerge at the upper end substantially dry and ready for the coating bath. Naturally the draft of heated air through chamber 53 will be regulated so as to be of such force, temperature and humidity as to substantially dry the priming coat without excessive loss of heat units at the upper open end of the chute-like chamber 53.

At the upper end of said chamber, the three strands pass over a direction-changing roller 55, or if desired over three idlers not shown, and then enter a bath 56 of natural rubber latex or an aqueous dispersion of neoprene, e. g., neoprene latex compound "L2210 A2" supplied by R. T. Vanderbilt Co., Inc. Bath 56 is in an open glass or like vessel 57 whose upper lip 58 (Fig. 9) has been fired so as to be very smooth for passage of the primed strands thereover. After entering the bath 56 the strands pass around an agitating and direction-changing roller 59 having three circumferential grooves 60 (when there are three strands). These grooves keep the strands separate as they pass through the bath. Without such grooves there is a tendency for the strands to "walk" together. Roller 48 in the priming bath 42 may also have circumferential grooves, although these are not shown. Roller 59 may have bath-agitating fins 61 projecting radially outwardly, as illustrated in Fig. 13. However, these fins may be omitted, as Fig. 9 shows. To distinguish these slightly different forms of roller, the embodiment of Fig. 9 is designated 59a. Fins 61 are specially useful whenever the coating bath is a mixture whose ingredients tend to separate into layers or form a deposit or precipitate on the bottom of vessel 57.

Rollers 59a and 59 are of Bakelite or the like and each has reduced or spindle ends 62 which are received in perforations at the lower ends of two vertical angle bars 63, 64. It will be understood that rollers 59 or 59a are freely rotating and are turned by frictional contact of the strands 26, 27, 28 with the grooves 60 formed in said rollers. The two vertical angle bars 63, 64 (Figs. 9, 10 and 12) are joined together at their upper ends by a straight, flat, horizontal tie bar 65, small studs 66 making the connection. Two angle bars 67, 68 are secured by screws (not shown) to the upper ends of vertical angle bars 63, 64 respectively and extend horizontally parallel to each other and at right angles to the longitudinal axis of tie bar 65. A second tie bar 69 is secured by screws 70 to the ends of the angle bars 67, 68, tie bar 69 being disposed below the horizontal flanges of said angle bars and being parallel to tie bar 65. The angle bars 63, 64, 67, 68 and the tie bars 65, 69 together form a rectangular horizontal frame having two depending members (63, 64) for supporting the agitating roll 59a or 59 in a horizontal position immersed in bath 56. Four or more studs 71 are passed through perforations in tie bar 69, as shown in Fig. 10, to secure the frame rigidly to a support, shown in phantom. Rigid support of the frame is essential, because any vibration or swinging will cause uneven coating of the strands.

A resiliently mounted roll hanger is carried on the described frame, said roll hanger consisting of two similar metal pieces held together by a Bakelite wiping cylinder 72. One of the two similar metal pieces 73 is shown per se in Fig. 12; it will be understood that this metal piece is shown in plan near the bottom of Fig. 10, and the corresponding metal piece 74 is shown near the top of said figure, the two metal pieces being mirror images of each other. Now the Bakelite wiping cylinder 72 does not rotate, hence it is rigidly secured at its ends to the depending arms 75, 76 of the metal pieces 73, 74 respectively, and the three parts 72, 73, 74 form an assembly which may be removed from or adjusted on the frame previously described. Another stationary wiping cylinder 77, also preferably of Bakelite, is mounted on the two vertical angle bars 63, 64 to extend horizontally in a plane above the top of bath 56. The three strands, after coating, pass between and directly contact the wiping cylinders 72, 77. Now wiping cylinder 77 has a smooth cylindrical surface but wiping cylinder 72 has two manually removable end shims 78, 79, as shown in Fig. 11. Shims 78, 79 are provided to space wiping cylinder 72 the desired distance from wiping cylinder 77 to regulate the thickness of the coating on the strands. Thus for a primer coat, 0.003 in. may be the preferred cylinder-spacing while for the second coat, 0.006 in. may be the most desirable spacing, and shims of the proper thickness will be substituted to effect the proper spacing. Any excess emulsion clinging to the strands will be wiped off as the strands pass between cylinders 72, 77. The wiping cylinders (which may have a diameter of about one-fourth of an inch) also force the coating into any voids which may be between the glass filaments which make up the strands 26, 27, 28. This is of primary importance to minimize abrasion, as any abrasion of a single filament will cause it to break and often a broken filament end, when the strand is flexed, will rub against adjacent filaments, abrading them also and causing early failure of the strand at that point.

The roll hanger has two integral springs 80, 81 extending at a small angle upwardly, as shown in Figs. 9 and 12, and the outer ends of springs 80, 81 are slotted as shown at 82 so that two of the four studs 71 which rigidly secure the frame to the support may be used also to secure the ends of the springs. A pair of vertical arms 83, 84 are parts of the metal pieces 73, 74 and have pins or studs 85, 86 press-fitted into holes at their upper ends so that the ends of said pins or studs project outwardly. Slots 87, 88 are cut in the vertical flanges of angle bars 67, 68 and extend vertically downwardly. The ends of pins 85, 86 are received in slots 87, 88 respectively when the parts are assembled, and the wiping cylinder 77 is kept pressed against the end shims on wiping cylinder 72 by the reaction from springs 80, 81. Thus excess emulsion or compound is wiped off the three strands and forced into any voids therein, as previously explained. The described construction has been found to work very well for both a priming coat and a second or final coat for glass strands and its use in connection with both baths 45, 56 will be understood without additional illustration. If desired, another stationary wiper like fabric wiper 49, 50 may be used directly above the latex bath 56. Sometimes dry latex will accumulate on the wiping cylinders 72, 77, then will flake off and be carried up by the wet coated yarn into the drying chamber to be described. Such flakes will detract from the value of the product of the invention. The employment of a stationary wiper will remove flakes but will not remove the latex coatings, if properly designed and positioned.

The coated strands, after wiping, move up into a drying or vulcanizing chamber 90 which is like chamber 53, being from 12 ft. to 30 ft. or more in length and having its lower open end spaced a short distance above the upper end of chamber 53, as shown in Figs. 1 and 2. Thus some of the heated air from chamber 53 may rise and enter the lower end of chamber 90. The three strands enter the vulcanizing chamber 90 as separate strands and are almost immediately brought together and twisted by the action of a twister and winder assembly (to be described) located above the upper end of chamber 90. During this twisting radiant heat is supplied by commercial infra-red heating units 91 such as are shown in Figs. 8a and 8, four of which may be used in each 10 ft. of chamber length, with two facing each other as illustrated. Infra-red heaters are particularly desirable because they cause rapid drying inside the coating as well as on the outside. These heating units are each about 4 ft. long and have solid heating rods 92 supported by intermediate spacers 93 and end walls 94, 95. Metal reflectors 96 reflect the heat radiated from rods 92 back toward the center of the drying chamber, where the multi-ply strand S is traveling. If desired, the reflectors 96 may focus the rays on the strand. Perforated ears 97 secured to the opposite ends of each unit 91 permit the units to be fixed within chamber 90 by means of bolts 98 passing through said ears and through the walls of the chamber. These units will be arranged with the heating rods 92 parallel to the longitudinal axis of chamber 90, hence parallel to the composite strand. Heating energy comes from a source of electricity indicated in Fig. 1, and the current is led to a wall switch 99, then to a "Powerstat" or rheostat 100 having a hand wheel turning a pointer on a scale to regulate the current and hence the temperature in the chamber 90. From the rheostat 100 the current is conducted through cables 101 to suitable connections with the heating units 91 inside chamber 90. A "Micromax" or thermometric indicator 102 has thermocouples (not shown) within chamber 90 so that the temperature to which the strands are exposed may be observed during operation of the apparatus, and control of the heat may be effected by adjusting the rheostat 100. Amalgamation of the strands is effected because of the residual solvent still remaining in the coatings adhering to the strands. The infra-red units, besides drying, effect a set of the plastic coatings while the yarn is under tension. Complete impregnation of the coated yarns is accomplished by the squeezing or pressing arising from the twisting of yarns coated with a fluid plastic coating.

The twister-winder assembly, shown in Figs. 1–7 inclusive, includes a bench or stand 105 made of steel shapes and carrying brackets 106 which support a variable speed reversible motor 107 having a reversing switch 108 and speed-control apparatus not shown. Motor 107 has its shaft vertical and at the upper end of said shaft a sheave 109 is secured to drive a V-belt 110 which is trained around a larger sheave 111 to rotate the twister-winder assembly about a vertical axis that coincides with the path of travel of the 3-ply strand S. A flat plate 112 is fixed on top of stand 105 and a ball bearing (not shown) is housed partly in the plate and supports a commutator consisting of two hollow copper rings 113, 114 with a Bakelite or other insulating ring 115 interposed between them. It will be understood that plate 112, the ball bearing, and the commutator are all hollow in the center to permit strand S to travel upwardly through them to be wound on spool 116. Fixed to the top of the commutator is a hollow shaft 117 which rotatably supports a horizontal arm 118, several bolts 119 making the connection. A glass tube 120 is secured in the center of hollow shaft 117 and provides a vertical guide for strand S, which is fed off tube 120 directly to the motor-driven spool 116. Glass tube 120 should have both its ends fired and flared, for reasons already explained.

Secured to one end of arm 118 by means of a bracket 121 is an electric winding motor 122 arranged with its shaft vertical. Motor 122 is energized through wires 123 which extend along arm 118 to an electrical connection with the copper rings of the commutator. The commutator rings are energized through carbon brushes carried by a Bakelite brush holder 124. Wires W are electrically connected to the brushes by the usual form of connectors, unnecessary to describe, and are connected to a source of electricity as will be understood. Means may be provided to vary the speed of winding motor 122; for example, motor 122 may be direct current driven, and a rheostat, not shown, may be placed in its circuit.

A speed reducer 125, preferably built into the casing of winding motor 122, includes worm gearing, not shown, and drives a shaft 126 extending horizontally above arm 118 at a suitably low speed, between about 36 R. P. M. and about 100 R. P. M., for example. Shaft 126 is connected by a shaft coupling 127 to another shaft 128 which is rotatably supported near one end by a bearing member 129 which may rock on pivots between the two arms of a yoke 130 that is adjustably supported upon arm 118. Shaft 128 has a squared, hexagonal or other non-circular portion 128a adapted to fit in a complementary bore provided in spool 116 so that said spool may be rotated on its axis by shaft 128. A compression coil spring 131 is carried on shaft portion 128a and presses against spool 116 at one end, while its other end is abutted against an end of bearing member 129. The arrangement is such that spool 116 may slide on shaft portion 128a toward and away from bearing 129 when acted upon by a cam 132. Cam 132 is a modified heart-shaped cam, as illustrated, and its edge bears against a flat cam follower plate 133 which is preferably circular and is rigidly secured to spool 116 by means of several bolts and nuts, with spacers, indicated at 134. Shaft portion 128a extends through a central hole in cam follower 133 and is directly coupled to a worm 135 which drives a worm wheel 136 fixed to a stub shaft 137. Stub shaft 137 is mounted in bearings supported on a vertical U-shaped bracket which is bolted on top of arm 118. Cam 132 is keyed to stub shaft 137 to be rotated thereby at a very slow speed. The extreme end of shaft 128 is cylindrical to be rotatable in a bearing 139 pivotally supported by the two arms of a yoke 140 which is adjustably supported upon arm 118. A set of weights 141 are bolted on the extreme end of arm 118 to balance the assembly, these weights being added to or taken away until a good dynamic is obtained. If spool 116 is of 1 in. diameter, arm 118 may be rotated 314 R. P. M. to give three turns or twists to one inch of strand S, or at higher speeds to yield a strand having a higher twist.

With the parts arranged as described, it is possible to remove the spool 116 after it is completely wound, but only by dismounting shaft 128, which is a tedious procedure. Obviously the spool should be, and in practice it will be, easily mounted and removed by hand so that an empty spool may be substituted for a wound one. There are many known ways of accomplishing this desirable result, but as such constructions lie outside the scope of the present invention, none of them is shown.

*Operation*

Assuming that the apparatus has been set up and the baths arranged, and further that the three strands have been run through by hand and attached to the spool 116 so as to be wound up, then the sources of heat are energized and motors 107 and 122 are started. Immediately spool 116 starts rotating on its axis to continue winding of the 3-ply strand S, and the twister-winder assembly, including spool 116 and arm 118, starts rotating on a vertical axis coinciding with the axis of glass tube 120. Thus the three strands are twisted together within chamber 90 to form a single 3-ply strand S that is wound upon the spool. The slowly rotating cam 132 causes the spool to move slowly longitudinally (axially) to one extremity of its path, while spool rotation continues, then pause momentarily, and move slowly in the opposite direction to the other extremity, where a slight pause again occurs.

The throw of the cam is equal to the length of the spindle of the spool between its heads, so that the strand is wound evenly over the entire spool. Coil spring 131 maintains contact of the cam follower plate 133 with cam 132 when the twister-winder assembly is at rest or is slowly rotating; but at a certain speed, centrifugal force comes into play, and firm contact between the cam and the follower plate will be maintained at that speed even if the coil spring were not present.

When the spool is full, it will be removed and the strand may then be rewound upon a bobbin designed for the market, or it may be rewound upon a glass tube 20. Three such tubes, each holding a 3-ply coated, twisted strand, may be supported upon a platform similar to platform 24 and may then be coated with one or more coats, in the manner previously described; then the three 3-ply strands may be twisted together and wound as a 9-ply coated strand upon a spool. When making a 9-ply strand from three 3-ply strands, or any multi-ply strand from several inter-twisted, multi-ply strands, the direction of rotation of the twister-winder assembly must be reversed, which is accomplished by reversing motor 107. In other words, an S twist must be followed by a Z twist, and a Z twist by an S twist, in order to equalize the stresses set up in the yarns by the drying of the coatings while the yarns set under tension. If all the yarns in a multi-ply strand were given a like twist, the resultant cord would coil, i. e., would not lay straight, hence would be difficult to handle. Obviously the outer coating for a 9-ply strand may be different from the outer coating described above for a 3-ply strand. Also, the twisting may be at a different rate than those mentioned in that connection. Four, five or six strands may be handled in the described apparatus about as easily as three strands. The described apparatus will handle the coating, twisting and winding continuously, with each step in the process synchronized.

Multi-ply strands made in accordance with the described method may be knitted or woven and may even be knotted without breakage of the individual filaments when subjected to a considerable load. A wide variety of fabrics and other multi-strand fibrous structures may be made from strands having such characteristics.

What I claim is:

1. Apparatus for making coated twisted fiber glass strands comprising, in combination, means for feeding a plurality of unsized or desized fiber glass strands, a liquid elastomeric coating bath through which the strands travel, a drying or vulcanizing chamber through which the coated strands travel in converging paths, a strand-twisting device rotatably mounted near the discharge end of the drying or vulcanizing chamber, said device being power-driven and causing the coated strands, while still moldable from partial drying, to be twisted together inside the drying or vulcanizing chamber, and means for winding up the multi-ply strand composed of the intertwisted coated strands.

2. Apparatus for making coated twisted fiber glass strands comprising, in combination, means for feeding a plurality of unsized or desized fiber glass strands, a liquid elastomeric coating bath through which the strands travel, a drying or vulcanizing chamber through which the coated strands travel in converging paths, a twister-winder assembly rotatably mounted adjacent the discharge end of said chamber, said assembly being power-driven and causing the coated strands, while still moldable from partial drying, to be twisted together inside the drying or vulcanizing chamber, and said assembly simultaneously winding up the multi-ply strand composed of the intertwisted coated strands.

3. Apparatus for making coated twisted fiber glass strands comprising, in combination, means for feeding a plurality of unsized or desized fiber glass strands; a priming bath through which said strands move so as to be coated; a drying chamber through which the primed strands move; a coating bath through which the dried primed strands travel; a drying or vulcanizing chamber through which the coated strands travel in converging paths; heating means inside the drying or vulcanizing chamber; a twister-winder assembly rotatably mounted adjacent the discharge end of the drying or vulcanizing chamber, said twister-winder assembly being power-driven and causing the coated strands, while still moldable, to be twisted together inside the drying or vulcanizing chamber, and said assembly simultaneously winding up the multi-ply strand resulting from the twisted strands; and operator-controlled means to vary the R. P. M. and also the direction of rotation of the twister-winder assembly so as to regulate the number of twists per inch and the direction of said twists.

4. Apparatus for making coated twisted fiber glass strands comprising, in combination, means for feeding a plurality of unsized or desized fiber glass strands; a priming bath through which said strands move so as to be coated; a drying chamber through which the primed strands move; a coating bath through which the dried primed strands travel; an elongated drying or vulcanizing chamber disposed vertically with open upper and lower ends; infrared heating elements inside the drying or vulcanizing chamber, said heating elements being connectible with a source of electrical energy; the coated strands traveling the length of the drying or vulcanizing chamber being exposed to radiant heat from said infrared heating elements; and a power-driven twister-winder assembly rotatably mounted adjacent the open upper end of the drying or vulcanizing chamber and causing the coated strands to be twisted together inside said chamber while the coatings are still somewhat moldable, said assembly simultaneously winding up the multi-ply unitary strand resulting from the twisted strands.

5. Apparatus for making coated twisted fiber glass strands comprising, in combination, means for feeding a plurality of unsized or desized fiber glass strands; a priming bath through which the strands move so as to be primed; fabric wiping means fixed in the paths of travel of the primed strands and adapted to contact the strands to remove by rubbing any fuzz on the strands arising from projecting ends of broken filaments in said strands; a drying chamber through which the primed strands move; a coating bath through which the dried primed strands travel; a drying or vulcanizing chamber through which the coated strands then move; a power-driven twister-winder assembly rotatably mounted adjacent the open upper end of the drying or vulcanizing chamber and causing the coated strands to be twisted together inside said chamber while the coatings are still somewhat moldable, said assembly simultaneously winding up the multi-ply unitary strand resulting from the twisted strands.

6. A process of making multi-ply coated fiber glass strands which comprises passing a plurality of the strands simultaneously through a bath containing a liquid elastomeric material which will coat the strands, then immediately passing the coated strands through a drying or vulcanizing chamber with concomitant twisting so that the strands carrying the coating act as pressure pads and by means of the torque applied bring about an impregnation of the individual strands which make up the multi-ply strand; the time interval and atmospheric conditions which the strands are subjected to within the chamber being so controlled that the coating material is set while the multi-ply strand is under tension in and traveling through said chamber and the multi-ply strand becomes a unitary structure with no tendency to untwist.

7. A process of making multi-ply coated fiber strands which comprises passing a plurality of the strands simultaneously through a priming bath, then immediately passing the strands through a heated chamber to dry the priming coat, then immediately passing the primed strands through a bath containing a liquid elastomeric material which will coat the strands, then immediately passing the coated strands under tension through a heated drying or vulcanizing chamber with concomitant twisting to unite the strands, the time interval and heat which the strands are subjected to within the drying or vulcanizing chamber being so controlled that the coating material is set while the multi-ply strand is under tension in said chamber and the multi-ply strand becomes a unitary structure with no tendency to untwist.

References Cited in the file of this patent

UNITED STATES PATENTS

| | | |
|---|---|---|
| 1,587,729 | Hubbard | June 8, 1926 |
| 1,724,200 | Hubbard | Aug. 13, 1929 |
| 2,080,905 | Bartell | May 18, 1937 |
| 2,089,229 | Taylor et al. | Aug. 10, 1937 |
| 2,234,986 | Slayter | Mar. 18, 1941 |
| 2,244,415 | Arnold | June 3, 1941 |
| 2,373,078 | Kleist | Apr. 3, 1945 |
| 2,403,305 | Rossiter et al. | July 2, 1946 |
| 2,475,922 | Stockly | July 12, 1949 |
| 2,493,359 | Painter | Jan. 3, 1950 |
| 2,500,523 | Crosby et al. | Mar. 14, 1950 |
| 2,601,394 | Hansen | June 24, 1952 |
| 2,730,455 | Swann | Jan. 10, 1956 |